3,454,610
SYNTHESIS OF ORGANOMETALLIC HALIDES
BY REDISTRIBUTION
Horst G. Langer, Cochituate, Mass., assignor to The Dow Chemical Company, Midland, Mich., a corporation of Delaware
No Drawing. Filed May 26, 1966, Ser. No. 553,016
Int. Cl. C07f 7/00, 7/22, 7/24
U.S. Cl. 260—429.7          10 Claims

ABSTRACT OF THE DISCLOSURE

This invention concerns an improved process for the preparation of organometallic halides of Group IV–A metals by a redistribution reaction. By reacting an organometallic compound of a Group IV–A metal with a solution of a halide of the same metal in a dialkyl sulfoxide, a high yield of an organometallic halide conforming in structure to the theoretical redistribution product can be obtained under mild conditions.

---

Redistribution or exchange of organic groups bonded to polyvalent metals is a general reaction at elevated temperatures, particularly with metals of Group IV–A. Indeed the preparation of organotin compounds other than a tetraorganotin derivative depends on separating complex mixtures or discovering a suitable redistribution reaction which forms primarily just the desired product. For example, by proper choice of reactant ratios, mono-, di- and trialkyltin halides can be obtained by the redistribution of a tetraalkyltin heated with tin tetrachloride:

$$3R_4Sn + SnCl_4 \rightarrow 4R_3SnCl \quad (1)$$
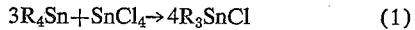
$$R_4Sn + SnCl_4 \rightarrow 2R_2SnCl_2 \quad (2)$$
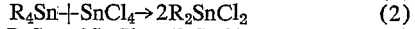
$$R_4Sn + 3SnCl_4 \rightarrow 4RSnCl_3 \quad (3)$$

Although the reactions are complex, the products conform to the theoretical redistribution indicated in the above equations. Unfortunately recovery of the desired organometallic halide from such a reaction is often complicated by further exchange particularly when distillation is required.

It has now been discovered that such redistribution reactions can be achieved rapidly under mild conditions which facilitate isolation and recovery of the desired redistribution by using as a reaction medium an aliphatic sulfoxide of the formula: $R_1R_2SO$ wherein $R_1$ and $R_2$ are independently $C_1$–$C_6$ alkyl groups or together a $C_2$–$C_6$ alkylene group and mixing therein the organometallic compound of the Group IV–A metal and a corresponding metal halide.

An important factor in this process is the in situ formation of a sulfoxide complex of the redistribution product, e.g., a compound of the formula:

$$R_cMX_{4-c} \cdot (R_1R_2SO)_n \quad (I)$$
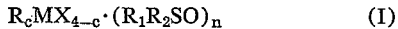

wherein
R is an organic group,
M is the Group IV–A metal,
X is chlorine, bromine or iodine,
c is an integer from 1–3, and n is 1 or 2.

By using stoichiometric amounts of reactants, the desired organometallic halide can often be recovered from the reaction mixture as a stable, crystalline sulfoxide complex of high purity. Such complexes are a particularly convenient way to handle and store these organometallic halides. The organometallic product halide can be recovered from the sulfoxide complex when desired by known techniques.

This improved redistribution process is generally applicable to the synthesis of organometallic halides of Group IV–A metals as shown in Equation 4:

$$R_aMX_{4-a} + R_bMX_{4-b} \rightarrow R_cMX_{4-c} \quad (4)$$
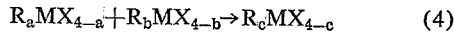

wherein R is the organic group, M is the Group IV–A metal, X is chlorine, bromine or iodine, $a$ is 2–4, $b$ is 0–2 and $c$ is an integer between $a$ and $b$ (e.g., $a < c > b$). R is preferably a $C_1$–$C_{12}$ alkyl, aryl, alkaryl or aralkyl group. The halide X is preferably chloride although a bromide or iodide can be used.

Because of availability, the usual reactants are a tetrasubstituted organometallic compound ($R_4M$) and the corresponding tetrahalide ($MX_4$), e.g., the reaction of Equation 4 wherein $a$ is 4 and $b$ is 0. As shown in Equations 1–3, the redistribution product then is dependent on the reactant ratios, $c$ being 1, 2 or 3. Obviously a mono-, di- or trisubstituted organometallic halide can also be used as a reactant.

A critical element in this process is the aliphatic sulfoxide which functions both as a liquid reaction medium and as a complexing agent to facilitate formation and recovery of the desired product. Suitable sulfoxides include dimethyl sulfoxide, diethyl sulfoxide, methyl ethyl sulfoxide, dihexyl sulfoxide as well as ethylene sulfoxide and tetramethylene sulfoxide. Under normal conditions, the tetraorganometallic compounds ($R_4M$) do not form sulfoxide complexes. However Group IV–A organometallic halides with 1–3 organic substituents form definite complexes with 1 or 2 moles of these aliphatic sulfoxides, at 20–120° C. The structure and stability of these complexes is influenced by steric as well as other factors.

To obtain a high purity product the reactants must be used in proper stoichiometric amounts. Separate solutions of the organometallic compound and metal halide are usually prepared in the dialkyl sulfoxide and then intermixed.

Redistribution occurs readily under mild conditions, often at 20°–50° C. although higher temperatures up to about 120° C. may be desirable at times. Indeed cooling is frequently necessary to moderate the exothermic reaction. A reaction time of an hour is often adequate but with less soluble reactants longer periods may be desirable to achieve essentially complete redistribution.

Depending on its solubility characteristics, the organometallic halide-sulfoxide complex may crystallize as formed. At times cooling or dilution with an inert nonsolvent such as benzene, toluene or other liquid aromatic hydrocarbon or a mixture of such a hydrocarbon and a $C_1$–$C_4$ alcohol may assist recovery of the sulfoxide complex. The sulfoxide complexes of the redistribution products are quite stable at room temperature. But when desired the organometallic halides can be isolated by stripping the dialkyl sulfoxide in vacuo at about room temperature or by dissolving the complex in a suitable solvent wherein dissociation into the free organometallic halide and sulfoxide occurs.

The organometallic halides prepared by this redistribution process have recognized utility as catalysts, paint additives, plastic stabilizers, etc. Not only are they biologically active in themselves, but also they are valuable intermediates in the synthesis of other compounds including many active fungicides. In most cases the sulfoxide complexes can be used in the same manner.

The following examples illustrate further the present invention and the advantages of the novel process. Unless otherwise stated all parts and percentages are by weight. Optimum conditions for these and other systems within the scope of the claims can be determined in routine manner.

Example 1.—Methyltin trichloride

To a slurry of 11.0 parts (0.05 mole) of dimethyltin dichloride in about 55 parts of dimethyl sulfoxide at room temperature was added dropwise over 30 minutes 13.0 parts (0.05 mole) of tin tetrachloride. Although the reaction mixture was cooled in an ice bath, the temperature increased to about 60° C. during the addition. After complete addition the mixture was stirred at 60–100° C. for a few minutes to complete the reaction. Cooling and addition of about 50 parts of 1:1 benzene-alcohol precipitated the white, crystalline methyltin trichloride complex containing two moles of dimethyl sulfoxide in better than 90 percent yield. Analysis indicated a purity of at least 98–99 percent.

Example 2.—Phenyltin chlorides

In three separate runs, 2.61 parts (0.01 mole) of tin tetrachloride was dissolved in 55 parts of dimethyl sulfoxide. Each solution was heated to about 100° C. Then (a) 1.42 parts (0.0033 mole), (b) 4.27 parts (0.01 mole) or (c) 12.8 parts (0.03 mole) of tetraphenyltin was added. In run c, sufficient additional dimethyl sulfoxide was added to cause complete dissolution of the reactants. Samples from each run were concentrated in vacuo at 100° C. and the residues analyzed by infrared. Redistribution to phenyltin trichloride, diphenyltin dichloride and triphenyltin chloride respectively in runs $a$, $b$ and $c$ was established.

Example 3.—Triphenyllead chloride

A solution of 1.29 parts (2.5 mmole) of tetraphenyllead and 1.08 parts (2.5 mmole) of diphenyllead dichloride in 22 parts of dimethyl sulfoxide was stirred at about 100° C. for 24 hours. Then the undissolved reactants were removed and the filtrate diluted with 10–20 parts of water to hydrolyze the dimethyl sulfoxide complex and precipitate triphenyllead chloride in about 50 percent yield.

I claim:
1. In a process for the synthesis of organometallic halides of Group IV–A metals by redistribution of a more highly organo-substituted organometallic compound, the improvement which comprises using as a reaction medium an aliphatic sulfoxide of the formula:

$$R_1R_2SO$$

wherein
$R_1$ and $R_2$ are independently $C_1$–$C_6$ alkyl groups or together a $C_2$–$C_6$ alkylene group, and reacting therein an organometallic compound of formula $R_aMX_{4-a}$ with an organometallic halide of formula $R_bMX_{4-b}$ to yield an organometallic halide of formula $R_cMX_{4-c}$ wherein R is an organic group,
M is a Group IV–A metal,
X is chlorine, bromine or iodine, and
$a$ is 2–4, $b$ is 0–2, and $c$ is an integer between $a$ and $b$.

2. The process of claim 1 wherein the redistribution product is obtained as sulfoxide complex of the formula:

$$R_cMX_{4-c} \cdot (R_1R_2SO)_n$$

wherein
each R is a $C_1$–$C_{12}$ organic group,
M is a Group IV–A metal,
X is chlorine, bromine or iodine,
c is an integer from 1–3, and
n is 1 or 2.

3. The process of claim 2 wherein the metal is tin.
4. The process of claim 2 wherein the metal is lead.
5. The process of claim 2 wherein the sulfoxide is dimethyl sulfoxide.
6. The process of claim 2 wherein the sulfoxide is tetramethylene sulfoxide.
7. The process of claim 2 wherein the redistribution reaction is carried out at 20°–120° C.
8. The process of claim 7 wherein the product is a sulfoxide complex of a phenyltin chloride.
9. The process of claim 1 wherein the product is triphenyllead chloride.
10. The process of claim 7 wherein the product is the dimethyl sulfoxide complex of methyltin trichloride.

References Cited

UNITED STATES PATENTS

| | | | |
|---|---|---|---|
| 3,036,103 | 5/1962 | Johnson | 260—429.7 |
| 3,055,845 | 9/1962 | Merten et al. | 260—429.7 X |
| 3,067,225 | 12/1962 | Reindl et al. | 260—429.7 |
| 3,069,448 | 12/1962 | Reindl et al. | 260—429.7 |
| 3,151,142 | 9/1964 | Arimoto | 260—437 |
| 3,248,411 | 4/1966 | Neumann et al. | 260—429.7 |
| 3,297,732 | 1/1967 | Banks | 260—429.7 |

FOREIGN PATENTS 1,215,709  5/1966  Germany.

TOBIAS E. LEVOW, Primary Examiner.

W. F. W. BELLAMY, Assistant Examiner.

U.S. Cl. X.R.

260—429, 437